US009272423B2

(12) United States Patent
Gordon et al.

(10) Patent No.: US 9,272,423 B2
(45) Date of Patent: Mar. 1, 2016

(54) ROBOTIC TOOL INTERCHANGE SYSTEM

(75) Inventors: Mark D. Gordon, Lafayette, CO (US); Jeffrey P. Davies, Louisville, CO (US); Christopher M. White, Frederick, CO (US); William H. Vermeer, Longmont, CO (US); Timothy J. Kelly, Boulder, CO (US); Michael J. Vega, Longmont, CO (US); Matthew A. Whitlock, Broomfield, CO (US)

(73) Assignee: Stratom, Inc., Boulder, CO (US)

( * ) Notice: Subject to any disclaimer, the term of this patent is extended or adjusted under 35 U.S.C. 154(b) by 228 days.

(21) Appl. No.: 13/335,473

(22) Filed: Dec. 22, 2011

(65) Prior Publication Data
US 2012/0298706 A1 Nov. 29, 2012

Related U.S. Application Data

(60) Provisional application No. 61/426,445, filed on Dec. 22, 2010.

(51) Int. Cl.
*B60R 11/06* (2006.01)
*B25J 15/04* (2006.01)

(52) U.S. Cl.
CPC .......... *B25J 15/0483* (2013.01); *B25J 15/0491* (2013.01)

(58) Field of Classification Search
CPC ........ B62D 62/04; F41H 7/005; Y10S 901/50
USPC ................................................. 224/401, 929
See application file for complete search history.

(56) References Cited

U.S. PATENT DOCUMENTS

| 5,706,990 | A | * | 1/1998 | Lahrson | 224/410 |
| 5,711,388 | A | * | 1/1998 | Davies et al. | 180/168 |
| 6,443,543 | B1 | * | 9/2002 | Chiang | 312/223.3 |
| 7,836,811 | B1 | * | 11/2010 | Gardner et al. | 89/40.04 |
| 8,157,032 | B2 | * | 4/2012 | Gettings | 180/9.32 |
| 8,474,161 | B2 | * | 7/2013 | Cunningham | 37/403 |
| 8,594,844 | B1 | * | 11/2013 | Gal | 700/246 |
| 2006/0163350 | A1 | * | 7/2006 | Melton et al. | 235/435 |
| 2008/0262646 | A1 | * | 10/2008 | Breed | 700/226 |
| 2008/0264991 | A1 | * | 10/2008 | Foster | 224/519 |
| 2009/0314554 | A1 | * | 12/2009 | Couture et al. | 180/8.7 |
| 2010/0102596 | A1 | * | 4/2010 | Chapman | 296/193.03 |
| 2011/0144828 | A1 | * | 6/2011 | Chengalva | 701/2 |
| 2013/0030661 | A1 | * | 1/2013 | Opperman | 701/50 |

FOREIGN PATENT DOCUMENTS

JP            05294147 A  * 11/1993

* cited by examiner

*Primary Examiner* — Brian D Nash
(74) *Attorney, Agent, or Firm* — Holland & Hart LLP

(57) ABSTRACT

Systems and methods for mounting and using various different accessories on a robotic system such as a unmanned ground vehicle (UGV). A tool library may include interchangeable modules, each module having a number of tool holders. Electronic components may be mounted to each of the modules adjacent to each of the of tool holders that identify the module and tool that is associated with the tool holder. The UGV may have a reader that is capable of reading the electronic components to determine the module and tools that are available for use on the UGV.

1 Claim, 10 Drawing Sheets

ROBOTIC TOOL INTERCHANGE SYSTEM

BACKGROUND

Both military and civilian police and security personnel can encounter situations in which it is desirable to remotely inspect or handle dangerous or potentially dangerous items. For example, it may be desirable to inspect, handle, or work on objects in locations where it is not possible, or not desirable, to send a person. Remotely operated devices, such as remotely operated robots or unmanned ground vehicles (UGVs) may be used in such situations. Throughout this disclosure, reference is made to a system for use with an unmanned ground vehicle (UGV), with the understanding that such a platform is one exemplary embodiment in which a system of this disclosure may be used, and that the disclosed systems have broad applicability for use in other and different platforms.

UGVs commonly include an arm that has a gripper assembly, and a camera mounted on the arm or on the UGV platform itself. An operator located a safe distance away operates the UGV using a video feed from the camera to inspect or work on an object, using the arm and gripper assembly to move or otherwise access the item. In many cases the arm, as mentioned, has a gripper that may be used to grasp and rotate an object. In some situations, the gripper may hold another tool that may be useful in a particular situation, such as a probe for probing soil that may be used to cover a control line that could be used to detonate an explosive device. However, in many situations, it may be desirable to have another type of tool mounted to the arm. Such may be the case when a gripper assembly, or a tool held by the gripper assembly, would not be the most advantageous tool for a particular situation. For example, it may be desired to have a powered tool for a certain situation, such as a drill. Equipping a robotic arm with a different tool generally takes some time, which may not be desirable during high-stress and time-sensitive operations such as deactivation of explosive ordnance for example. Furthermore, in some cases an operator may not know the optimum tool for a particular job until an UGV is actually adjacent to the object of interest. Accordingly, providing options to an operator of such a remotely operated device would be useful.

SUMMARY

The present disclosure recognizes it would be useful to have a system in which a remotely operated device may have a library of available tools that may be selected by an operator. It would be advantageous to have such a system that is easily adaptable to allow the relatively fast exchange of different tools and that is straightforward to use. Embodiments described herein provide robotic accessories that are replacably mountable to a robotic arm and storable on a holding assembly that may be attached to the remotely operated device. Tools are stored on a UGV on a module that is mounted to the UGV. Such a module may be relatively easily mounted and removed to the UGV through thumb screws, for example. In certain embodiments the modules are identical and interchangeable. The modules, in some embodiments, include electronic components that identify the module and associated tool, allowing for the configuration of modules on the UGV to be detected and reported from the UGV to an operator. Modules may be selected and mounted to a UGV based on the particular mission for the UGV. In certain embodiments, specialized tool holder modules provide for calibration and diagnostics of an associated tool.

A plurality of modules may be mounted to a UGV according to various embodiments, allowing for a library system of tools for the UGV. A locking mechanism, in some embodiments, secures the tool to the module. The mechanism may be protected from damage due to roll-over, etc. In some embodiments, the locking mechanism is actuated by robot's own motion. Low robot arm precision is compensated for using V-shaped guides that allow proper alignment of the tool to the module.

When a tool is attached to the robotic arm, in some embodiments, a connection assembly is employed at the robotic arm head that allows for such tool attachment. In one embodiment, the head connection assembly has a cone/funnel shape that receives a corresponding conic-shaped section on the tool. The corresponding conic shapes allow for correction of angular, axial, and rotational mismatch between head and tool. Locking between the head and tool may be facilitates using a plunger, balls, and chamfered race.

In some embodiments, RFID tags embedded in tools, manipulators, or sensors, provide identification of the device as well as device characteristics and GUI configurations. Further embodiments provide non-contact robotic manipulator power and data interface that uses inductive coupling between a robotic arm and a device to provide power to the device and communications to/from the device. The data provided from the tool allows complex tools to be connected to a robotic platform having a fixed, generalized control interface, and be controlled from a robot operator's GUI panel without the robot or control panel having any previous information regarding the tool characteristics or controls.

These and other advantages and novel features of the disclosure will be set forth in part in the description which follows, which discloses various embodiments, including the currently preferred embodiment.

DETAILED DESCRIPTION

Figure 1:
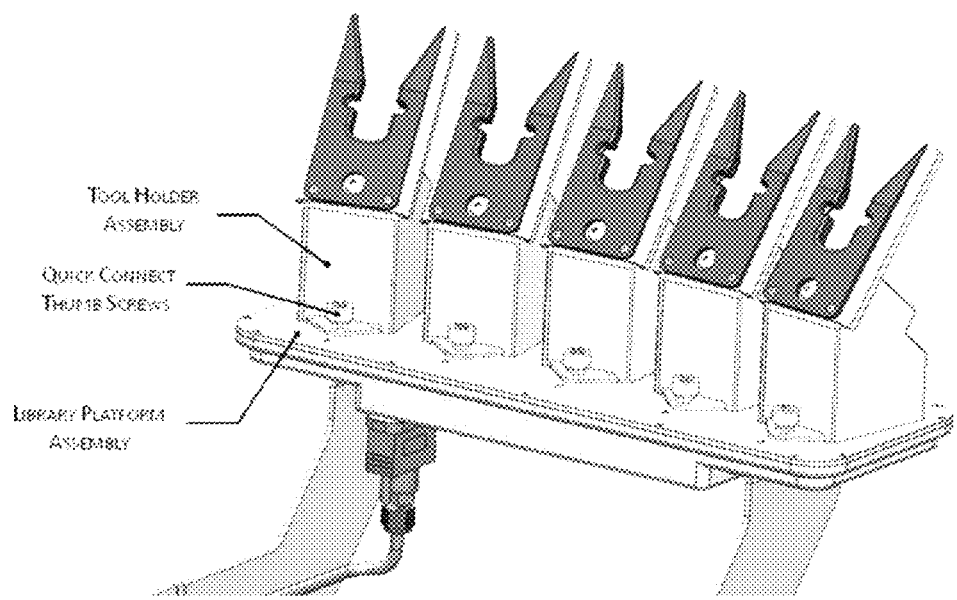
FIG. 1 is a perspective view of a modular tool holder system according to various aspects of the present disclosure.

For a more complete understanding of this invention, reference is now made to the following detailed description of several embodiments as illustrated in the drawing figures. Various embodiments are described herein, with specific examples provided in many instances to serve to illustrate and discuss various concepts included in the present disclosure. The specific embodiments and examples provided are not necessarily to be construed as preferred or advantageous over other embodiments and/or examples. Furthermore, concepts described herein may be used with numerous different settings and situations.

The present invention is generally directed to systems and methods for mounting and using various different accessories on a robotic system such as a UGV. The present disclosure recognizes that UGVs commonly have features and characteristics that make easy and reliable tool change a challenge. For example, UGVs generally have low precision arms and controls compared to high precision industrials arms that may be encountered in general industrial or lab-based robotics applications. Such low precision arms and controls result in unreliable arm placement at various preset positions. For example, an arm on a UGV may have a "home" position and may base movements of the arm on the home position and a certain number of steps of a stepper motor that is used to actuate the arm. Low precision arms and controls results in an arm that is often not at the precise location that would be expected based on an arm movement command. Furthermore, such arms commonly have significant amounts of flexibility and compliance. Additionally, the vehicle itself may not be level or particularly stable, further contributing to the low precision of movement of the arm.

Further considerations in such applications include power usage considerations, as available power is limited, and overall power consumption is a limitation to mission performance. Additionally, it is beneficial for such vehicles to have failsafe conditions, such that tools are not dropped from the arm in the event of a power interruption. UGVs generally also require operation in harsh environments with significant amounts of dirt, rocks, wind, moisture, and temperature extremes, to name a few. The present disclosure provides systems and methods for connection and operation of different tools to a UGV that provide efficient and reliable operations under such conditions.

Figure 2:
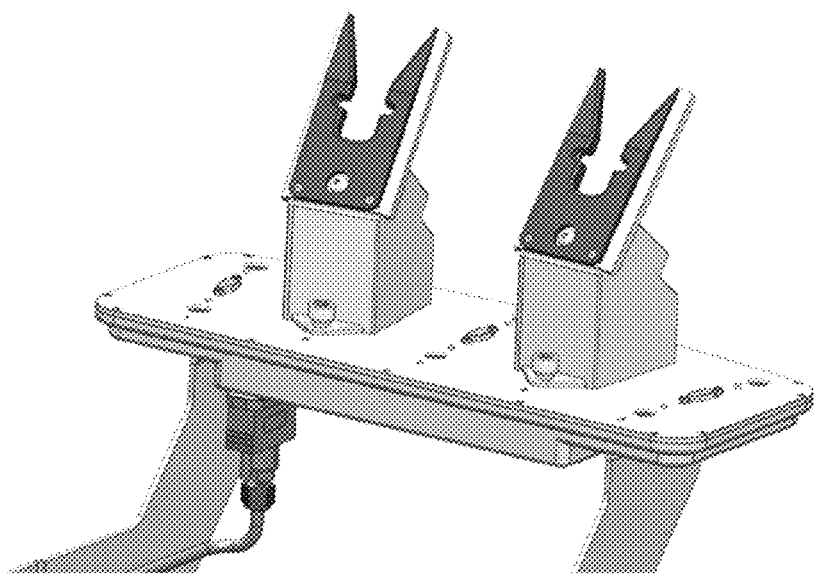
FIG. 2 is another perspective view of a modular tool holder system according to various aspects of the present disclosure.
Figure 3:
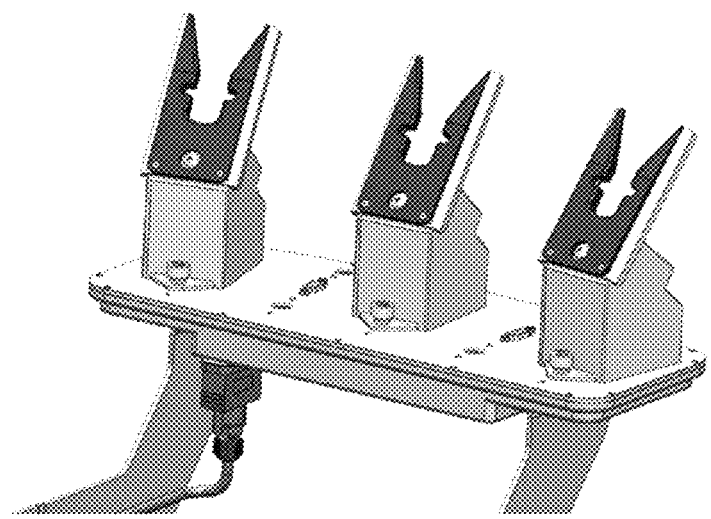
FIG. 3 is another perspective view of a modular tool holder system according to various aspects of the present disclosure.

With reference to FIGS. 1-3, several examples of a modular tool holder system for a robotic tool library are illustrated. For this discussion the term "tools" is meant to include a range of robotic manipulators, tools, sensors, or other devices that are utilized by the robot, all of which are referred to herein simply as "tools." The present disclosure recognizes that industrial robotics systems utilizing fixed tool holder racks, or libraries, are known. Additionally, UGV robotic systems have been developed that provide racks also allowing robots to carry interchangeable tools. In those systems, however, the ability to modify and reconfigure the library to meet particular mission requires is not a specific feature. Furthermore, providing such a capability would present additional challenges, including identification of active and vacant tool holder positions, ease of installation and removal, and weatherproofing of the individual tool/library interfaces, to name a few examples. Various aspects of this disclosure provide modules and a library system that allows for efficient modification of the library configuration by human operators, automatic detection of the tool holder installation inventory, weatherproofing features of the tool holder/library mechanical interfaces, and modularity and interchangeability of the individual tool holders. Each of these features reduce workload for the human operators, and allow for optimization of the library system for a particular robot's mission.

The embodiments illustrated in FIGS. 1-3 show a library system according to an aspect of the disclosure which may be mounted to a UGV robot. In the examples of FIGS. 1-3, tool holder assemblies may be mounted to a library platform assembly, thereby providing a modular library system. Such a modular library provides the ability to reconfigure the number of tool holder stations and their positions on the library. This capability allows the library to be modified to accommodate a specific number of tools, the types and sizes of the tools, and the weight of the overall system to optimize the functionality of the robotic system to meet specific mission requirements.

For example, if five small tools are desired for the robot based on the expected requirements of a specific mission, the library can be configured with those specific tool holders, such as in FIG. 1. If a mission is expected to require the use of two small tools and one larger tool, the unused tool holders may be removed to accommodate the space requirements of the larger tool and to minimize the weight of the overall robotic UGV.

The tool holders of such embodiments can be quickly removed and reconfigured by a human operator, and the new configuration of the overall library system can be automatically communicated to the robot so that it can operate optimally with the new library configuration. In one embodiment, each individual tool holder is identical, and can be installed at any tool holder position on the library. This feature reduces workload for the human operator by eliminating the need to install a particular tool holder at a specific position on the library.

As illustrated in the figures, the modular tool holder system includes the individual tool holders, and the library on which they are mounted. The library is attached to the robot, and the individual tool holders attach to the library. The library receives power from the robot and, in some embodiments, includes bi-directional data communication capability to the robot. As will be readily understood by one of skill in the art, many types of robot UGVs have, for example, a serial communications port that may be used to transfer information and data to/from the UGV, and to/from remote computers. The library may include a serial communications connection and capabilities that connect to the UGV communications port.

The tool holders, in various embodiments, are attached to the library using knurled knob thumb screws which are easily manipulated by human operators of the robotic system. Additionally, the tool holders connect electrically to the library through mating connectors which are sealed with gaskets to provide a weather resistant interface. Internal electronics within the tool holders provide communications capability, in some embodiments. Such tool holders may include, for example, proximity sensing and the ability to read and write to radio frequency identification (RFID) tags that are embedded into the removable tools. The internal tool holder electronics may also provide the interface to communicate the proximity sensor and RFID data to the library's internal electronics, and ultimately to the robot's onboard software and control systems. Specialized tool holders can be provided, according to some embodiments, which contain additional proximity sensors and electronics to allow them to be used as position calibration and diagnostics devices.

Once connected, the library internal electronics communicates with the individual tool holders installed at various positions on the library and builds an inventory identifying what positions on the library are being utilized and what positions are vacant, and additionally what position actually contain tools. This inventory information is communicated to the robotic system for use by its software and control systems without the need for additional interaction with the human operators.

As mentioned above, various modules may be mounted on the library system. Different interchangeable modules provide a reliable method of transporting and locking multiple tools on a UGV. Each module, in an embodiment illustrated in FIGS. 4-7, includes a locking device comprising a notch and a spring loaded locking blade. The mechanism in its free state is in the locked position and the mechanism is internal to the system giving it protection from unlocking or damage during a collision or rollover. The module also assists in getting the tool back into the tool holder on the library by self aligning features that account for axial, angular, linear and rotational misalignment.

Figure 4:
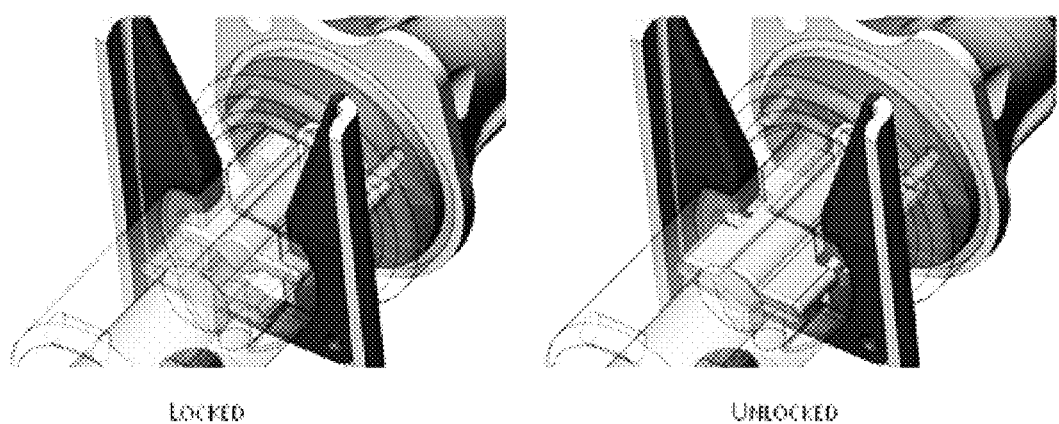
FIG. 4 is a perspective view of a tool holder according to various aspects of the present disclosure in a locked and unlocked configuration according to various aspects of the present disclosure.
Figure 5:
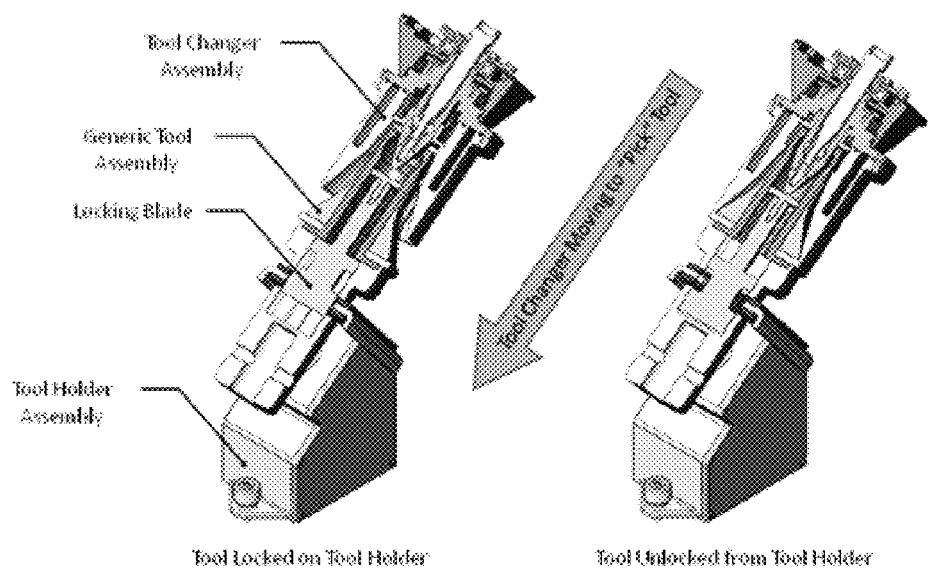
FIG. 5 is a perspective view, partially in cross-section, of a tool holder according to various aspects of the present disclosure in a locked and unlocked configuration according to various aspects of the present disclosure.

With specific reference to FIG. 4, each of the tools includes is a spring loaded locking blade that slides into a notch on the library tool holder module when locked. The tool is released from the tool holder by pushing the locking blade forward. FIG. 4 shows the blade in the notch when it is locked and out of the notch when unlocked. Such a design enables the tools to be unlocked and removed either manually by an operator using their finger or automatically by the robotic arm. FIG. 5 shows the locking blade being pushed forward by the tool changer assembly. As can be seen in the illustration of FIG. 5, a chamfered lead-in may be used to accommodate axial, angular, linear and rotational misalignment between the tool and the tool holder.

Figure 6:
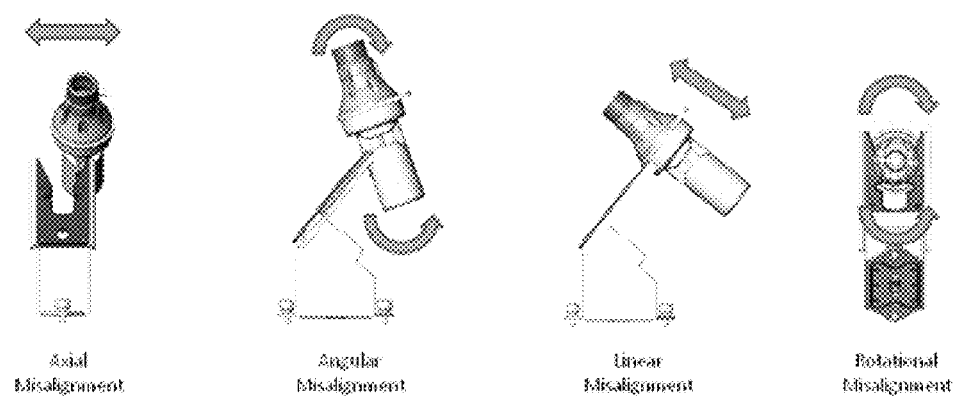
FIG. 6 illustrates several types of misalignment that may be present with respect to a tool holder according to various aspects of the present disclosure.
Figure 7:
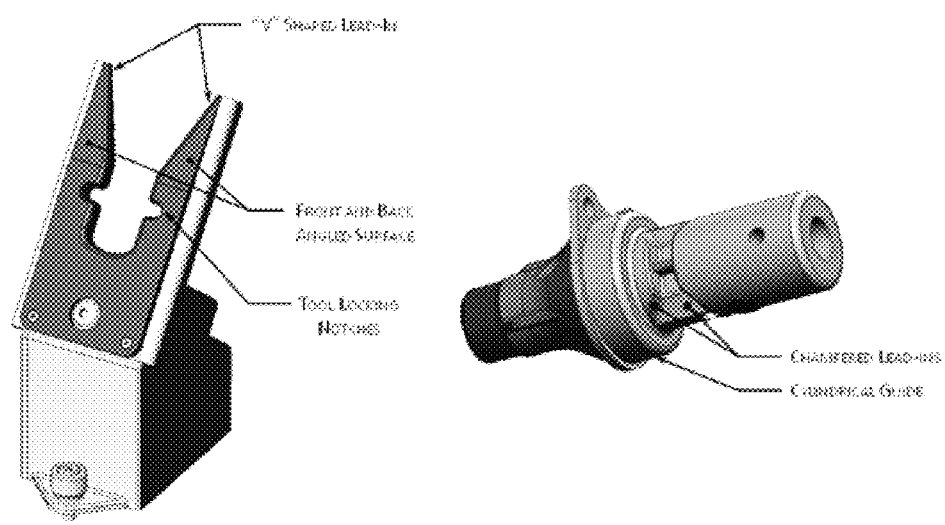
FIG. 7 illustrates various alignment features in a tool holder and corresponding connector according to various aspects of the present disclosure.
Figure 8:
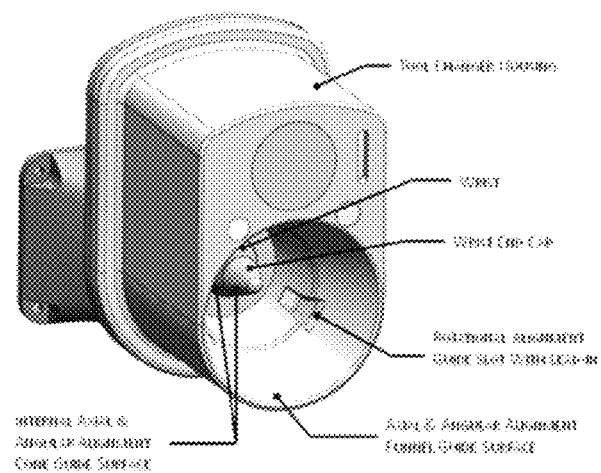
FIG. 8 illustrates a robotic arm interface according to various aspects of the present disclosure.

FIG. 6 shows the four different types of misalignment that may be present between the tool and the tool holder module. Several geometric elements are used to help align these four types of misalignment. The large "V" shaped guide on the tool holder module is used for axial, linear and rotational alignment. The angled surfaces on both the front and back of the tool holder module and the cylindrical guide on the tool are used for linear alignment. The chamfered lead-ins on the tool help with axial, angular and rotational misalignments. FIG. 7 shows the different alignment features in this embodiment.

Such alignment mechanisms are useful in a robotic tool library in various embodiments described herein because of the relatively imprecise movement of the robot arm. Robots commonly used in industrial robotic platforms, for example, use precise robotic arms capable of highly repeatable moves. However, UGVs commonly have less precise arms and are operated in a wide variety of environmental conditions that may further affect the movement of the robotic arm. There are numerous methods of locking tools to their respective libraries with industrial manufacturing equipment. However, when a relatively imprecise arm is employed on a UGV, different considerations have to be accounted for. In embodiments described herein, the locking mechanism is protected from accidental release and damage caused by collision or rollover which has a relatively high likelihood of occurring in applications utilizing systems of the various embodiments disclosed herein. Furthermore, smaller UGV's do not have high precision robotic arms, and the ability to adapt to misalignment is important for efficient operation of the UGV.

With reference now to FIGS. 8-15, the interface between the robotic arm and tools is described for an embodiment of the disclosure. The interface of this embodiment allows a non precise robotic arm to be capable of aligning and locking to a tool, manipulator, or sensor. The tool interchange system has two primary components, a tool changer head and a tool interface. The interchange system of this embodiment acts to converge the axial, angular and rotational alignment between the two subsystems and then firmly lock them together. The axial and angular alignment is accomplished using a funnel and cone concept. The rotational alignment is controlled using a fin and slot methodology. The locking mechanism creates a rigid mechanical coupling between the tool changer head and the tool interface by using a profiled plunger, three ball bearings and a chamfered race. In various UGV applications, these capabilities provide a system that can easily and quickly switch tools during the course of any given mission.

Figure 9:
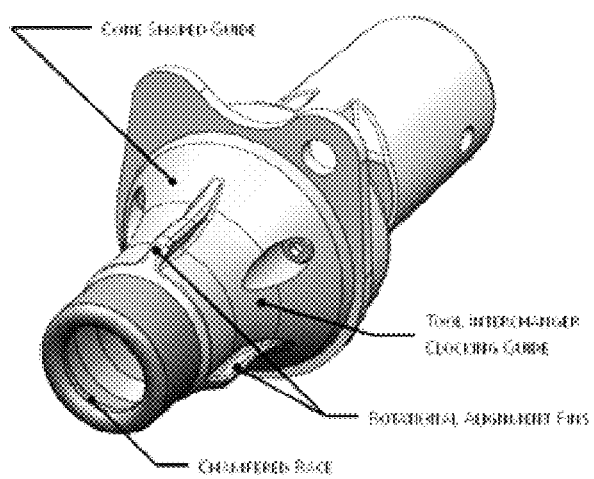
FIG. 9 illustrates a tool interface according to various aspects of the present disclosure.
Figure 10:
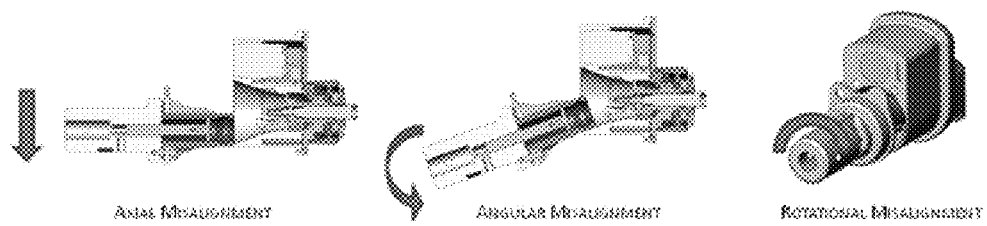
FIG. 10 illustrates the coupling of a tool interface and robotic arm interface, partially in cross-section, showing different types of mis-alignment, according to various aspects of the present disclosure.

The tool interchange system of this embodiment relies on components on both the tool changer head, as well as the tool interface, for correcting misalignment. On the tool changer head, the housing is the primary component that provides guidance. In the embodiment of FIGS. 8-15 the tool changer head has a funnel shaped surface, shown in FIG. 8, which corrects both the axial and angular mismatch between the tool changer and the tool. This surface also contains the rotational alignment guide slots. Each of these slots has chamfered lead-in to account for rotational misalignment. The other parts that are used for alignment on the tool changer side are the wrist and wrist end cap. These parts are internal to the funnel of the housing and their cone shaped surfaces help correct axial and angular misalignment. On the tool interchange side, the primary alignment part is the clocking guide, as illustrated in FIG. 9. This part contains the fins that mate up with the slots on the tool changer housing. The clocking guide also contains a cone shaped surface that interacts with the funnel on the tool changer side. FIG. 10 shows the three misalignments that are addressed and solved with the alignment mechanism of FIGS. 8 and 9.

Figure 11:
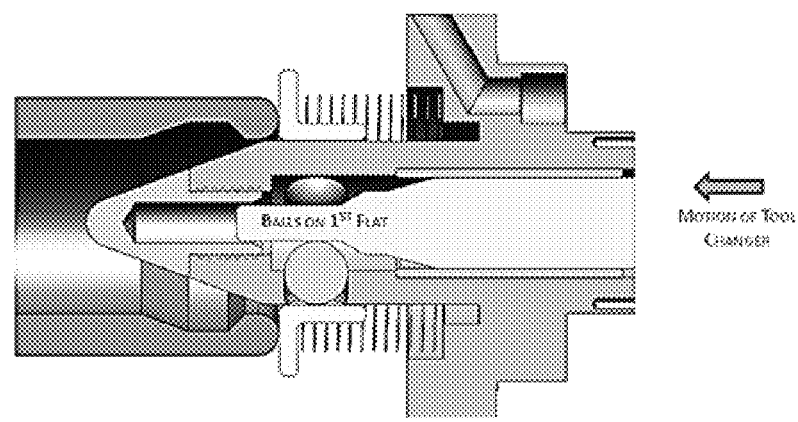
FIGS. 11-15 illustrate cross-sectional views of a locking mechanism of a robotic arm interface in various stages of coupling with a tool interface according to various aspects of the present disclosure.

The locking mechanism includes of three primary components. They are the plunger, the ball bearings and a race, and illustrated in the cross-sectional drawings of FIGS. 11-14. On the tool changer side, the wrist contains the plunger and balls. The tool interchange contains the chamfered race. There are four stages that occur during the locking process. Stage one is unlocked and has the ball bearings floating between the first flat on the plunger and the dust cover. This is shown in FIG. 11. Once the tool changer is driven onto the tool, the dust cover is refracted and the balls are captured between the first flat on the plunger and ball pockets on the wrist.

Figure 12:
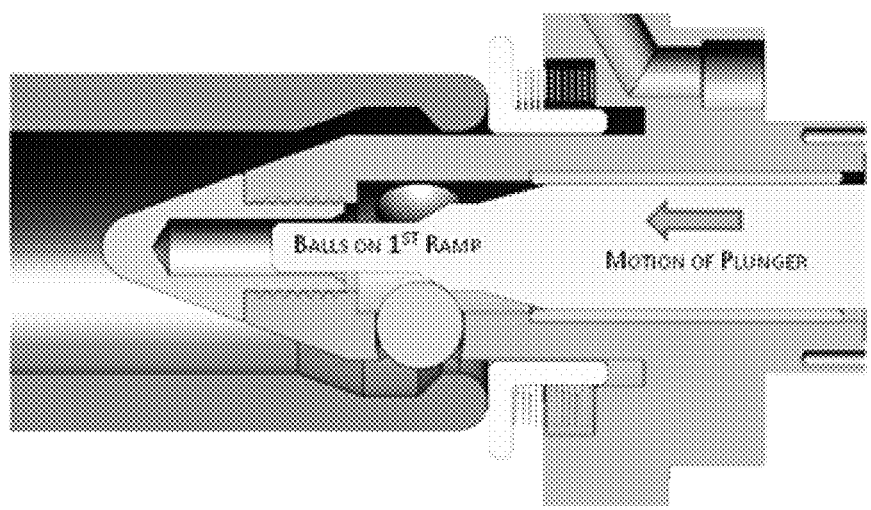

The second stage is initiated after the robot is informed that the tool is aligned and in the correct position for the locking process to successfully occur. It is then that the plunger is driven forward. As the plunger is extended, the three balls are pushed radially outward by the first ramped profile of the plunger. FIG. 12 shows this stage.

Figure 13:
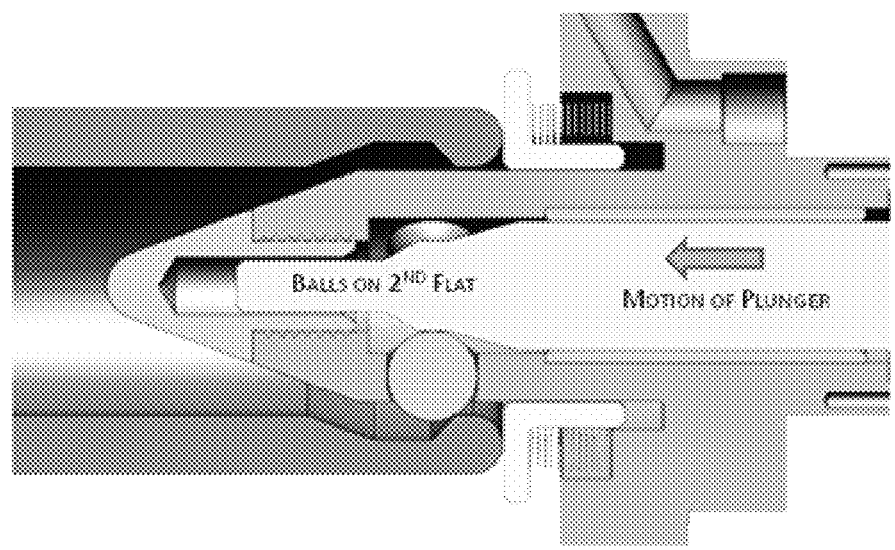

At stage three the balls are now on the second flat. In this position the tool changer and tool interface are inseparable. The balls occupy the recessed area of the race and the two cannot pass by each other. This second flat on the plunger is important, in this embodiment, because the X components of the residual forces created by trying to separate the tool from the tool changer are not transferred to back driving the plunger. Only the Y portions of the forces are transferred to the plunger. Stage three is shown in FIG. 13.

Figure 14:
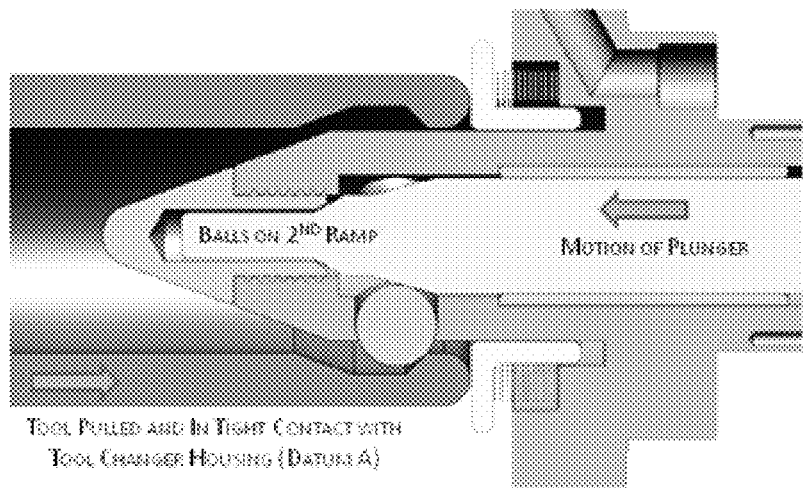

The final stage establishes the rigid connection between the tool changer and the tool. As the plunger continues to be extended, the balls are now gradually extended radially outward making contact with the ramped race. The balls transfer force to the angled surface of the race, causing the tool to get pulled farther into the funnel of the tool changer housing. Stage 4 is shown in FIG. 14.

Figure 15:
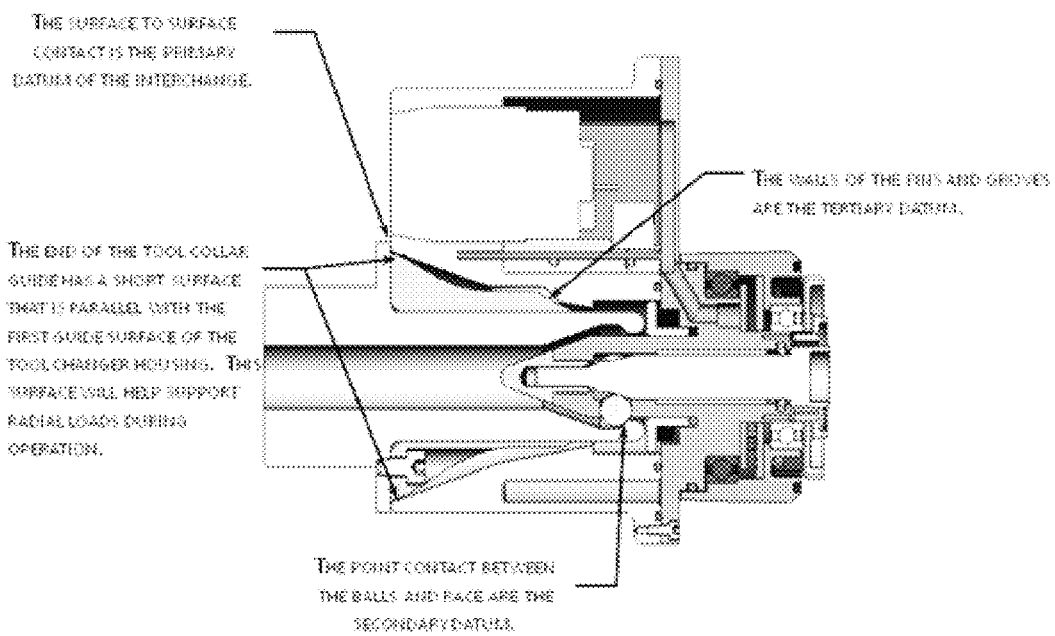

This last bit of motion causes the tool plate to come in contact with the tool changer housing. It is this contact that creates the primary rigidity of the tool to the tool changer. The position of the plunger in stage 4 is held in place with a linear geared mechanism that cannot be back driven. The design incorporates a primary, secondary and tertiary datum system to rigidly support the tool on the tool changer. This is shown in FIG. 15.

In some embodiments, power and communications are provided between the robot and a tool through a power and data interface. In one embodiment, the disclosure provides a non-contact interface for data and power. Such a non-contact interface allows a robot to attach tools or other instruments at the end of its arm, as described above, provide power to the tool, and create a two way data transfer channel to the tool without electro-mechanical contacts. This creates the capability for the robot to work in dirty or wet environments, and reduces the risk of operational failures caused by damaged connectors or contacts. The power transfer is achieved through the use of an inductive power transfer module. The data interface is achieved through the application of a wireless data link, in this particular embodiment an 802.11 wireless Ethernet link ("wifi"). The power and data transfer modules are installed into a common housing which attaches to the robotic arm. A power receiver and second wireless Ethernet module in tools complete the required hardware.

The application of the 802.11 wireless ethernet module is particularly advantageous because this interface is a widely used standard in most computer platforms, although it will be readily recognized by one skilled in the art that other protocols may be used as well. With an 802.11 interface, if the computer controlling the robot can use an Ethernet connection, it automatically has the ability to communicate with devices on the robot arm that also use Ethernet.

Figure 16:
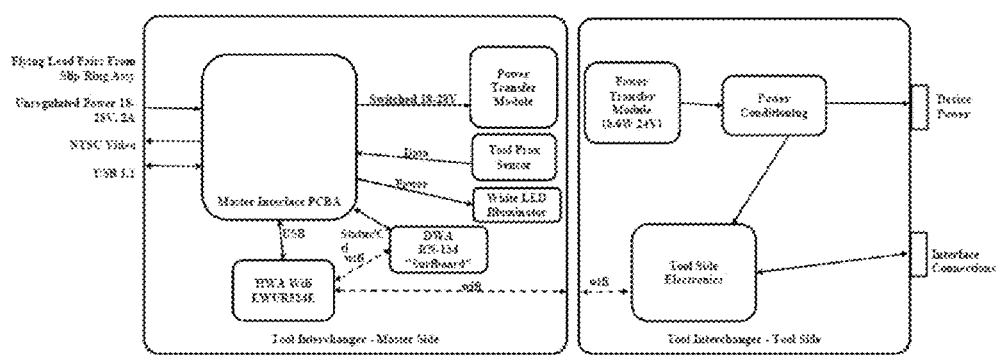
FIGS. 16 and 17 are block diagrams illustrating the general components and architecture of a non-contact power and data interface according to various aspects of the present disclosure.
Figure 17:
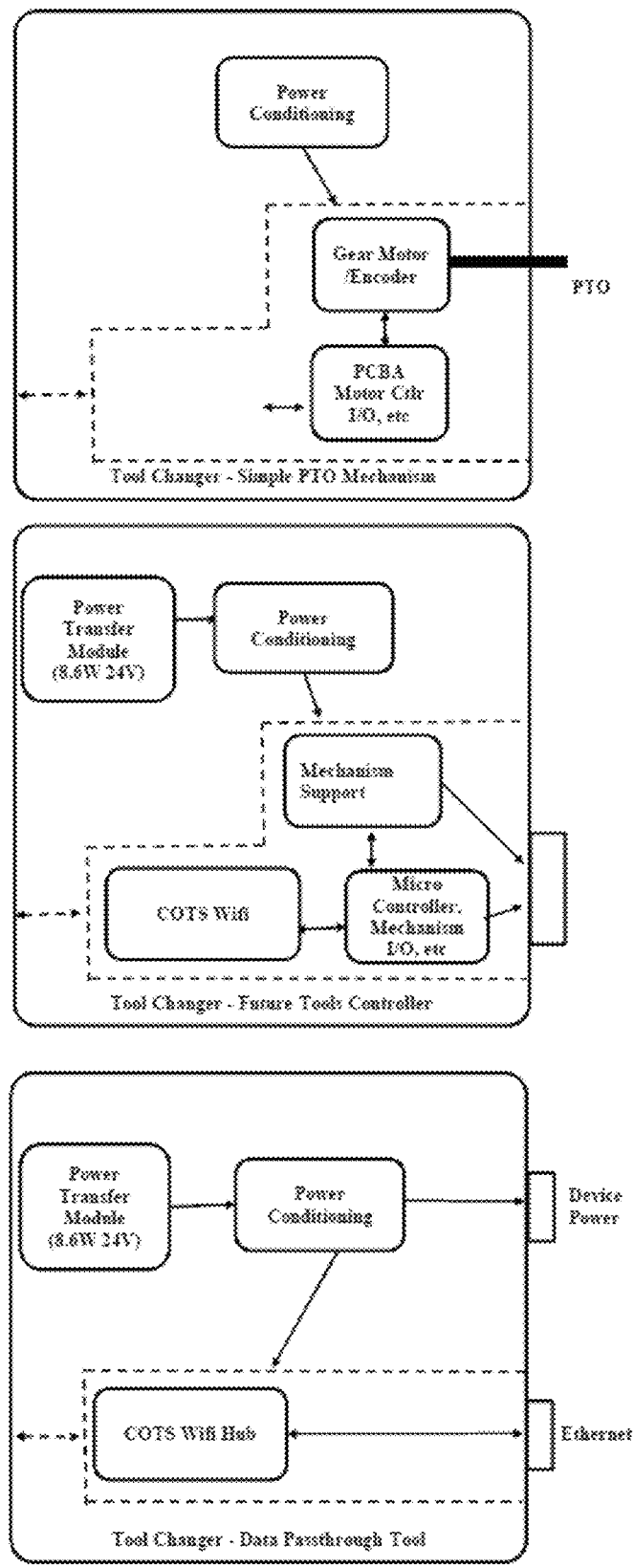

FIGS. 16 and 17 are block diagrams illustrating the general components and architecture of the non-contact power and data interface of exemplary embodiments. In this embodiment, inside the robot arm side, or master side, of the tool changer are electrical conditioning circuits and interconnections from the robot USB and power to the wireless Ethernet adapter and the inductive power transfer module. In the tool side module are the power receiver and wireless Ethernet module. The wireless Ethernet module may be any device that communicates through this protocol and provides connectivity to desired tools or instruments. The block diagram of FIG. 17 shows a few different exemplary embodiments that may be used according to this aspect of the disclosure.

The implementations shown in FIGS. 16 and 17 include a wifi controlled motor with mechanical power take off shaft, a wifi connected microcontroller creating an interface to a more complicated future tool having a custom serial data interface or other interface options, and a data pass through implementation where the wifi signals are received and made available at an external connector or where the wifi signals are received directly by the removable tool itself.

In another aspect, the present disclosure provides for identification of tools, manipulators, or sensors, their characteristics, and GUI configurations, using RFID tags embedded in removable robotic tools. In this aspect, embodiments include RFID tags embedded in removable, interchangeable robotic tools that store data identifying the tool, its characteristics and control interfaces, its interaction with the robot, and configuration of the graphical user interface used to operate the tool. The data is then used to define how individual control signals provided by the robot are used by the tool, how the robot's motion should be customized to utilize a given tool, and how a robot operator's GUI control panel for any particular tool should look. In the application for robotic vehicles, this enables the ability to connect and control a wide variety of tools on the robot without the need for the robot to have any pre-determined information about how the tool works, how it is to be used in conjunction with the robot, or how its remotely displayed operator console should be configured.

In robotic vehicle applications, it is often not practical to update software on the robot whenever a new tool becomes available. Therefore, embodiments of this aspect of the disclosure provide the ability to provide new tools for use on such a platform after it has been deployed and without the requirement for a software update.

In one embodiment, a robotic tool changer library contains a number of tool holders and tools. Each tool contains an RFID transponder. In each tool holder is a RFID read/write PCB. The read/write PCBs are connected to a central micro controller which reads the data from the individual transponders on each tool and communicates that information to the robot operator control unit (OCU) through the robot's normal communications systems.

When the robot picks up a particular tool, a generic data I/O interface between the tool and robot is established. This interface could be implemented using direct electrical contacts, or using an RF or optical data link, as is well understood in the art. The data from the transponder allows the OCU to redefine labels on a standard command and control interface and also defines what control features of the tool are connected to each of the generic interface connections or signals.

An example of the data contained in a prototype RFID tag is presented in Table 1. This data describes the tool and also the signal interfaces utilizing a wifi connected module used to control the tool, and poses the robot would move to after picking up the tool. In this example, the total data size is 220 bits.

TABLE 1

RFID Tag Data Assignments

| Data Type | Data Description | Data Bit Size |
|---|---|---|
| Tool ASCII Name | 8 characters of 1 byte | 64 |
| Tool Length | 16 categories | 4 |
| Tool Diameter | 16 categories | 4 |
| Data Output Enable | 5 digital control signals | 5 |
| Data Input Enable | 5 analog input signals | 5 |
| Data Output Initialization | Initially logic 1 or 0 | 5 |
| Verbose Mode Enable | User Interface Mode | 1 |
| Data Output Signal Names | 5 Signals, 1 Bytes Each | 40 |
| Analog Input Signal Names | 5 Signals, 1 Bytes Each | 40 |
| Tool Type | 1 Byte Category | 8 |
| Tool Serial Number | 1 Word | 16 |
| Tool Cycle Exchange Count | 1 Word | 16 |
| Checksum | 1 Byte | 8 |
| Robot Working Pose | 16 Categories | 4 |

As will be readily recognized, such a system may be used in many different applications where access and/or inspection of a space of interest or item of interest is required. For example, systems of various embodiments may be used to penetrate bags, such as a duffel bag or backpack that may contain an explosive device, and to remotely inspect and potentially disarm potentially dangerous items. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A tool library apparatus for an unmanned ground vehicle (UGV), comprising:
    a plurality of interchangeable modules mountable on a UGV, each module having a plurality of tool holders;
    a plurality of different types of tools removably coupled with the plurality of tool holders and usable by the UGV for remote unmanned operations; and
    a plurality of electronic components mounted to each of the interchangeable modules, wherein a separate electronic component of the plurality of electronic components is located adjacent to each of the plurality of tool holders, each of the separate electronic components comprising a tool identification that identifies which type of tool of the plurality of different types of tools is associated with the tool holder.

* * * * *